March 8, 1927.

A. B. BOWMAN 1,620,064

TRANSMISSION

Filed July 20, 1925   3 Sheets-Sheet 1

INVENTOR
A.B. Bowman
BY
ATTORNEYS

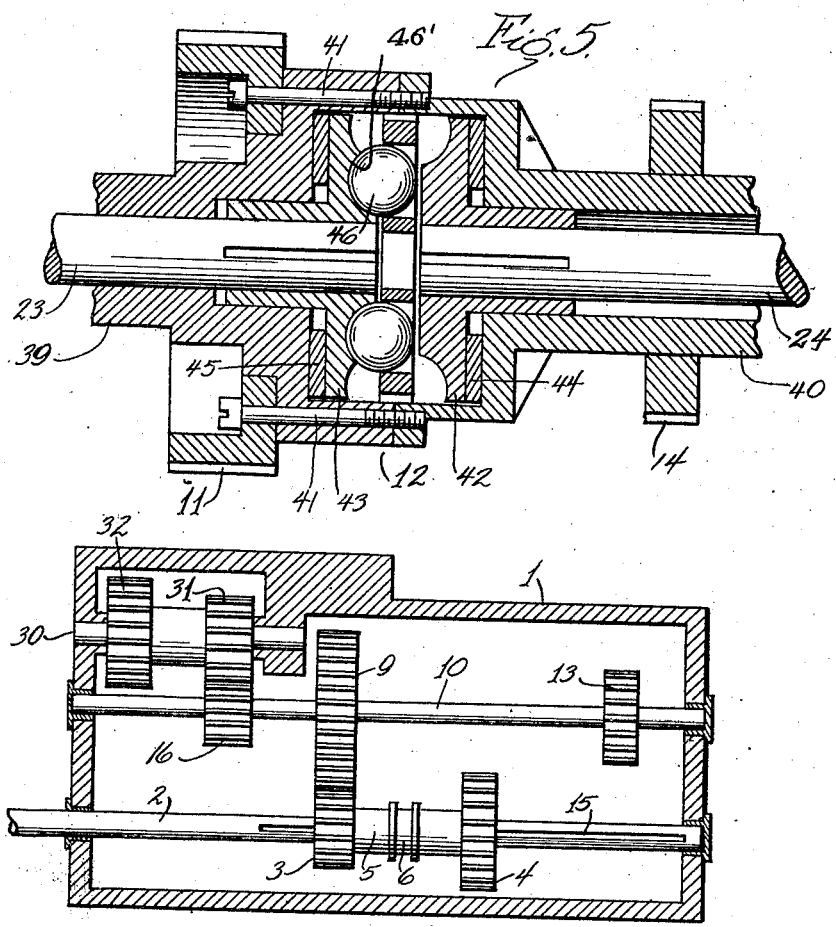

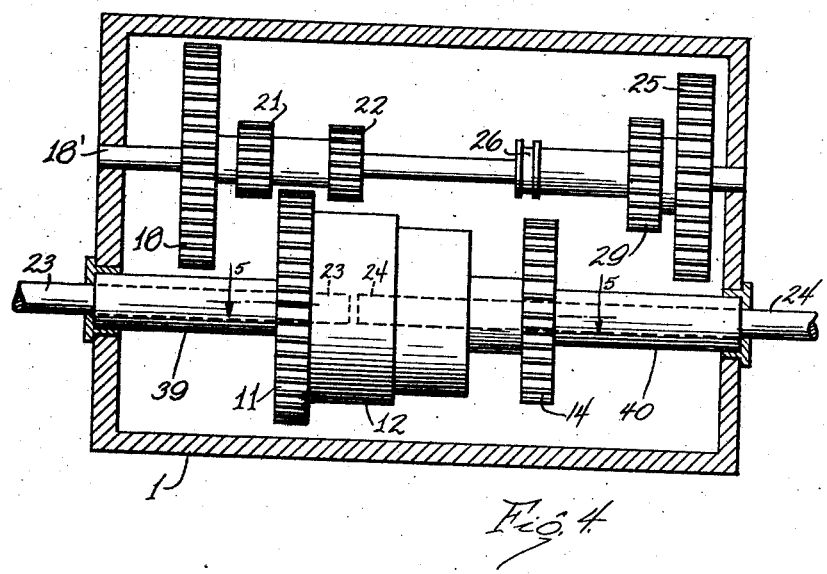
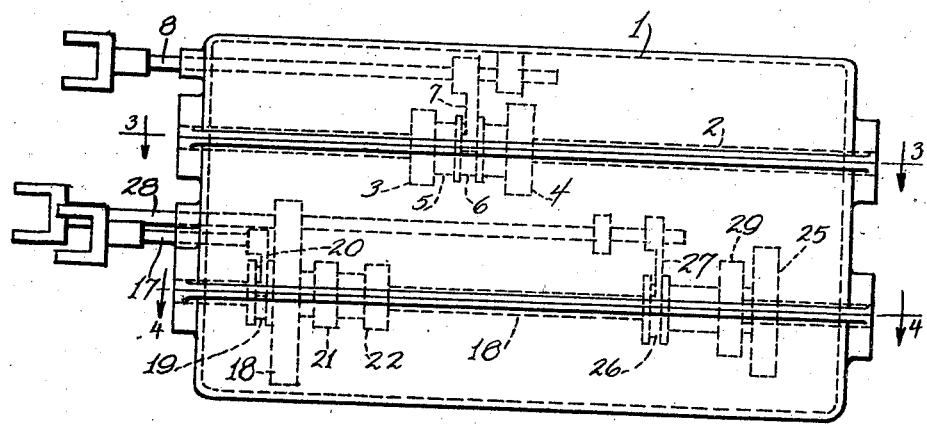

Patented Mar. 8, 1927.

1,620,064

UNITED STATES PATENT OFFICE.

ALBERT BOWER BOWMAN, OF GRAND RAPIDS, MICHIGAN.

TRANSMISSION.

Application filed July 20, 1925. Serial No. 44,844.

My invention relates to improvements in transmissions, and it consists in the combinations, constructions, and arrangements, herein described and claimed.

An object of my invention is to provide a transmission for a four wheel drive, the transmission being provided with novel means for connecting the motor shaft with the propeller shafts for the two highest speeds, with the fewest possible gears and for disconnecting all intermediate gears so as to have these gears remain idle while the two highest speeds are used.

A further object of my invention is to provide a transmission of the character described in which the transmission makes use of a differential for connecting the two propeller shafts with each other and with the motor shaft, whereby the front wheels may rotate at a different speed from the rear wheels and yet all of the wheels will be power driven from the engine.

A further object of my invention is to provide a transmission of the character described in which the gear mechanism in the transmission is arranged so as to provide a very compact construction even in view of the fact that the transmission employs five speeds in place of the usual four speeds.

Other objects and advantages will appear in the following specification, and the novel features of the invention will be particularly pointed out in the appended claims.

My invention is illustrated in the accompanying drawings, forming part of this application, in which—

Figure 1:
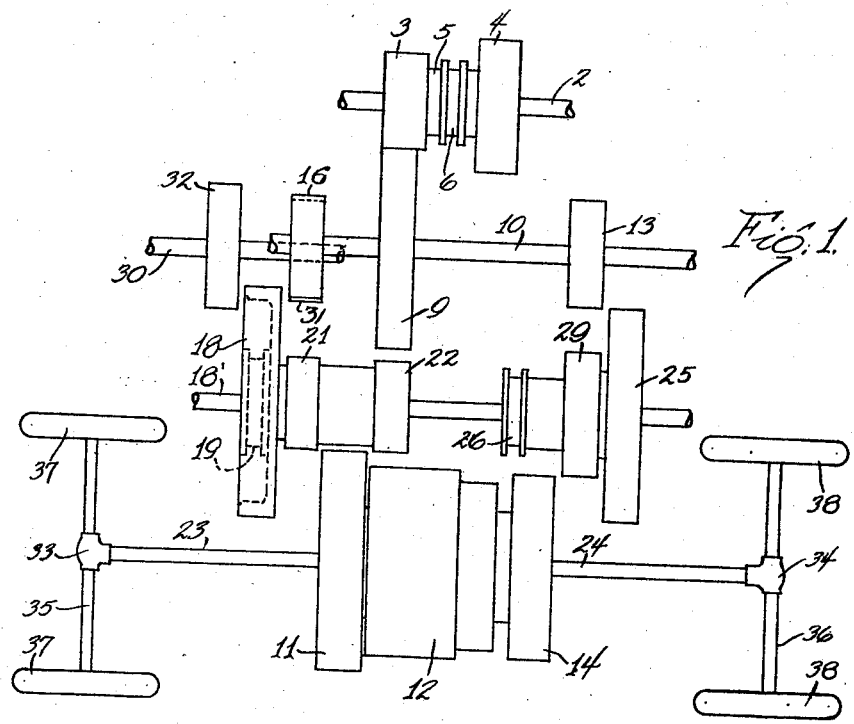
Figure 2:
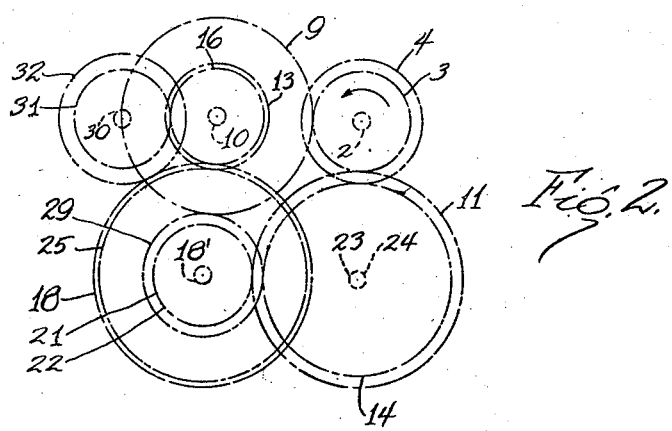

Figures 1 and 2 are diagrammatic views of the transmission showing the transmission operatively connected to the front and rear wheels of a vehicle, Figure 3 is a section along the line 3—3 of Figure 6, Figure 4 is a section along the line 4—4 of Figure 6, Figure 5 is a section along the line 5—5 of Figure 4, and Figure 6 is a side elevation of the transmission housing.

In carrying out my invention I provide a casing 1 (see Figure 6) that is composed of three sections, bolted together. This casing may be of any shape desired and constructed of a different number of pieces without departing from the spirit and scope of my invention. The casing carries a number of shafts, and these shafts in turn carry gears for effecting the various speeds.

Figure 1 shows how the shafts are operatively connected by the gears and for the purpose of clarity, I have disposed all of the shafts in the same plane. Figure 2 shows how the shafts are arranged with respect to each other so as to have the gears properly mesh with their respective gears. Referring now to the diagrammatic views shown in Figures 1 and 2, it will be noted that the motor shaft 2 carries gears 3 and 4. These gears are connected to each other by a collar 5, the collar in turn having an annular groove 6 in which a yoke 7 is disposed (see Figure 6). A rod 8 is operatively connected to the yoke 7 and projects from the casing 1 so as to be connected to a control lever, not shown.

The gear 3 is adapted to mesh with a gear 9 that is carried upon a counter shaft 10. The gear 3 is also adapted to mesh with a gear 11, the gear 11 in turn being connected to the differential 12. The gear 4 is adapted to mesh with a gear 14 connected to the differential 12. It will be seen from this construction that the rod 8 may be moved so as to connect the gear 3 with the gear 9, or the gear 11, and to connect the gear 4 with the gear 14. Figure 3 shows how the motor shaft 2 is provided with a key-way 15 to permit the gears 3 and 4 to be moved into the three different positions. In neutral position, the gear 3 meshes with the gear 9.

In shifting into first speed, it will be noted that the gear 3 already meshes with the gear 9. The counter shaft 10 upon which the gear 9 is mounted also carries a gear 16 that is turned when the gear 9 is turned. The operator, by a lever not shown, moves a rod 17 for sliding a gear 18 on a shaft 18' into mesh with the gear 16. Figure 1 shows how the gear 18 is provided with a collar 19, this collar receiving a yoke 20 (see Figure 6), whereby movement of the rod 17 will move the gear 18. It will further be noted from Figure 1 that the gear 18 is integral with gears 21 and 22, whereby movement of the gear 18 will also move these other gears.

In carrying through the first speed combination, it will be noted that when the rod 17 moves the gear 18 into mesh with the gear 16, the gear 21 is also brought into mesh with the gear 11. This completes the gear chain between the motor shaft 2 and the propeller shafts 23 and 24 because it will be noted that the gear 11 is connected to the differential 12, which in turn is connected to the propeller shafts 23 and 24 in a manner hereinafter described. In shifting into second speed, the gears 18 and 21 are moved into neutral position, as shown in Figure 1, and a gear 25 is moved into mesh with the gear 13 on the counter shaft 10. The gear 25 is moved by means of a collar 26, a yoke 27 and a rod 28. A gear 29 is also integral with the gear 25 and is moved therewith. When therefore the gear 25 is brought into mesh with a gear 13 on the shaft 10, the gear 29 meshes with the gear 14. The connection between the motor shaft 2 and the propeller shafts 23 and 24 will therefore be the gears 3, 9, 13, 25, 29 and 14.

The third speed position is effected by moving the gear 3 out of mesh with the gear 9 and into mesh with the gear 11. This is one of the high speeds. Fourth speed is obtained by moving the gear 4 directly into mesh with the gear 14. This is the highest speed.

It will be noted that in both of these high speeds, the gears 3 and 4 are disconnected from the intermediate chain of gears and are connected directly to the gears 11 and 14. This obviates the necessity of constantly rotating the intermediate shafts and gears when the transmission is in either of its two highest speed positions. It will further be noted that in the two highest speeds there is a connection between the motor shaft 2 and the propeller shafts 23 and 24, this connection being effected by the gears 3 and 11 or the gears 4 and 14.

In shifting into reverse speed, I make use of a reverse speed shaft 30 and gears 31 and 32. The reverse speed chain of gears between the motor shaft and the propeller shafts is as follows: gears 3, 9, 16, 31, 32, 18, 22 and 11.

In addition to the differential 12, I employ two standard differentials 33 and 34 for connecting the propeller shafts 23 and 24 with the front axle 35 and the rear axle 36. The differentials 33 and 34 permit the front wheels to turn at different speeds when rounding a corner, and in like manner permit the rear wheels to turn at different speeds with respect to each other when rounding a corner. The differentials 12, 33 and 34 connect all four wheels 37—37 and 38—38 with the motor shaft so as to provide a vehicle with a four wheel drive.

I will now describe briefly the construction of the differential 12. This differential forms no part of my invention except in so far as it cooperates with the parts already described. The gear 11 is mounted upon a housing 39 while the gear 14 is mounted upon a housing 40. These housings enclose the propeller shafts 23 and 24 and are connected to each other by bolts 41. A disc 42 is keyed to the propeller shaft 24, and in like manner a disc 43 is keyed to the propeller shaft 23. These discs are frictionally connected to the housings 40 and 39 by means of friction rings 44 and 45. The discs are separated from each other by a ball race 46. The rings 44 and 45 normally keep the propeller shafts 23 and 24 rotating at the same speed, but in this case if there is more strain upon one of the shafts than the other, the rings 44 and 45 permit a slight slippage between the discs 42 and 43 and the housings 39 and 40.

As just stated, the disc 42 rotates with the shaft 24 and the disc 43 rotates with the shaft 23. These discs are frictionally connected to the housings 39 and 40 by means of the rings 44 and 45. The rings are kept in contact with the inner walls of the housings and with the discs by ball bearings 46. These ball bearings, although normally keeping the discs 42 and 43 in the position shown in Figure 5, are adapted to be moved into the groove 46', as shown in Figure 5, to permit the discs 42 and 43 to move toward each other a slight distance, thus permitting the rings 44 and 45 to slip with respect to the discs and the housings for providing the necessary differential connection between the shafts 23 and 24.

From the foregoing description of the various parts of the device, the operation thereof may be readily understood. I have already described how the various gears may be moved so as to effect the five different speed combinations and have further shown how in the two highest speeds, the intermediate gears are disconnected so as to remain idle.

The device is very compact in construction, and is durable and efficient for the purpose intended.

The rods 8, 17, and 28 are operated by a control set of a standard make (not shown) such as the one built by the Savage Arms Co. of Utica, New York. Any means for moving the rods in the manner heretofore described will suffice.

I claim:

1. A transmission comprising a driving shaft, two gears mounted upon said driving shaft, a driven shaft, two gears operatively connected to said driven shaft, an intermediate chain of gears for each of said first named gears for connecting said first named gears with said second named gears, and means for directly connecting said first named gears with said second named gears and for disconnecting said chains of gears from said first and said second named gears.

2. A transmission comprising a motor shaft, a relatively small gear and a relatively large gear mounted upon said motor shaft and secured to each other by a collar, two counter shafts, two propeller shafts, a differential connecting said propeller shafts, a relatively large gear and a relatively small gear carried by said differential, an intermediate chain of gears mounted upon said counter shafts for connecting said relatively small motor shaft gear with said relatively large propeller gear, and means for disconnecting the intermediate chain of gears upon said countershafts from said relatively small motor shaft gear and said relatively large propeller gear, and for directly connecting said relatively small motor shaft gear with said relatively large propeller gear.

3. A transmission comprising a motor shaft, a relatively small gear and a relatively large gear mounted upon said shaft and secured to each other by a collar, two countershafts, two propeller shafts, a differential connecting said propeller shafts, a relatively large gear and a relatively small gear carried by said differential, an intermediate chain of gears mounted upon said counter shafts for connecting said relatively large motor shaft gear with said relatively small propeller gear, and means for disconnecting the intermediate chain of gears upon said counter shafts from said relatively large motor shaft gear and said relatively small propeller gear, and for directly connecting said relatively large motor shaft gear with said relatively small propeller gear.

ALBERT BOWER BOWMAN.